(12) United States Patent
Yajima et al.

(10) Patent No.: US 6,747,382 B2
(45) Date of Patent: Jun. 8, 2004

(54) MOTOR

(75) Inventors: Katsuhide Yajima, Nagano (JP); Hitoshi Mutai, Nagano (JP); Toshio Yamamoto, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 10/015,565

(22) Filed: Dec. 17, 2001

(65) Prior Publication Data
US 2002/0084709 A1 Jul. 4, 2002

(30) Foreign Application Priority Data

Dec. 19, 2000 (JP) ................................. P. 2000-384831

(51) Int. Cl.[7] ................................................ H02K 5/16
(52) U.S. Cl. ........................................ 310/90; 310/49 R
(58) Field of Search .......................... 310/90, 89, 49 R, 310/254, 252

(56) References Cited
U.S. PATENT DOCUMENTS 5,121,017 A * 6/1992 Yamamoto et al. ....... 310/49 R
5,798,589 A * 8/1998 Ohi et al. ..................... 310/90
6,404,086 B1 * 6/2002 Fukasaku et al. ............ 310/89
2002/0057028 A1  5/2002 Yajima et al.

* cited by examiner

Primary Examiner—Burton S. Mullins
Assistant Examiner—Karen Addison
(74) Attorney, Agent, or Firm—Sughrue Mion, PLLC

(57) ABSTRACT

In a small-sized motor used for lens drive, to provide the motor which is easy to attach to another member and gives space saving. Further, to provide a motor in which the number of parts is reduced thereby to improve assembly efficiency and make shaft accuracy good. Stator cores constituting a stator opposed to a rotor, an output portion side bearing that rotates and supports a side, near an output portion for operating an operated member, of a rotary shaft inserted and fixed into the rotor, and an opposite output portion side bearing holding portion (cap portion) for holding an opposite output portion side bearing that rotates and supports an opposite side to the output portion side of the rotary shaft are formed integrally by insert molding; and the output portion side bearing and the opposite output portion side bearing holding portion are made of resin.

4 Claims, 2 Drawing Sheets

MOTOR

CROSS REFERENCE TO RELATED APPLICATION

The present application is based on Japanese Patent Application No. 2000-384831, which is incorporated herein by reference.

BACKGROUND OF THE INVENTION

1. Field of the Invention

The present invention relates to improvement of a small-sized motor used for lens drive of a camera.

2. Description of Related Art

FIG. 2 is a sectional view of a small-sized motor with a lead screw, which is used for purposes of lens drive of a camera and the like. As shown in FIG. 2, in this motor, a metal frame 3 having a C-shaped section is fixed to one axial end of a stator 2 opposed to a rotor 1. Further, a bearing 4a is fitted into the other axial end of the stator 2, and one end of a rotary shaft 11 inserted and fixed into the rotor 1 is rotatably supported by this bearing 4a.

In this rotary shaft 11, its other end side protrudes from the stator 2, and its leading end is rotatably supported by a bearing 4b fitted into the metal frame 3. The portion of the rotary shaft 11 protruding from the stator 2, that is, the portion arranged in the metal frame 3 having the C-shaped section functions as an output portion 11a, at which a lead screw is formed. By rotation of the rotary shaft 11, this lead screw feeds axially an operation member (not shown) for operating a lens, whereby the lens is moved.

Such a conventional small-sized motor with a lead screw for driving a lens, since the metal frame 3 is attached to one end of the stator 2 as described above, has problems that an attaching method of the motor to another member is limited and that space-saving is difficult. Further, since the bearings 4a and 4b receiving each end of the rotary shaft 11 are supported respectively by the stator 2 and the metal frame 3 which are different members, shaft accuracy is not easy to obtain. Further, since the number of parts is large, assembly efficiency is bad, which makes it more difficult to obtain the shaft accuracy.

The inventors thought that the metal frame 3 was removed from one end of the stator 2 in consideration of the space saving and the assembly efficiency. In this case, it is necessary to fit a metal bearing for rotate-supporting a portion in the middle of the output shaft 11 to one end of the stator 2, that is, onto the attaching surface of the metal frame 3 in the above-mentioned example. However, regarding fitting of this metal bearing, the workability is bad. In case that the stator 2 and the metal bearing are integrally manufactured by insert molding in consideration of the work performance, a molding die is so complicated so that a problem of high cost is caused.

SUMMARY OF THE INVENTION

An object of the invention, in view of the above-mentioned problems, is to provide, in a small-sized motor used for lens drive, the motor which is easy to attach to another member and gives space saving. Further, another object of the invention is to provide a motor in which the number of parts is reduced thereby to improve assembly efficiency and shaft accuracy is good.

In order to achieve such the objects, a motor of the invention comprises a rotor; a rotary shaft inserted and fixed into the rotor; a stator core constituting a stator opposed to the rotor; an output side bearing provided on an output side of the rotary shaft, and supporting a portion near an output portion of the rotary shaft; and an opposite side bearing holding portion for holding an opposite side bearing supporting an opposite side to the output side of the rotary shaft; wherein the stator core, the output side bearing and the opposite side bearing holding portion are integrally formed by insert molding, and the output side bearing and the opposite side bearing holding portion are made of resin.

According to the invention, since the output side bearing and the opposite output side bearing holding portion, which were conventionally constituted by a different member from the stator, are formed integrally with the stator cores by insert molding, the number of parts can be reduced and position accuracy can be improved.

Further, the invention is characterized in that in the above-mentioned motor, a lead screw is formed at the output portion and a rotation of the lead screw directly affects an operated member.

Further, the invention is characterized in that in the above-mentioned motor, the opposite side bearing, which is urged to the output side and comprises an axially movable slide bearing, is arranged in a hole of the opposite output side bearing holding portion, and that an end of the rotary shaft is supported by this opposite output side bearing. Therefore, the rotary shaft can be exactly rotated axially in the more stable position, so that rotational position accuracy can be heightened.

Further, the invention is characterized in that in the above-mentioned motor, a hole having an inner diameter larger than an outer diameter of the rotor is formed in the opposite side bearing holding portion.

Further, in order to achieve the objects, a motor of the invention comprises a rotor, and a stator opposed to the rotor and constituted by stator cores, wherein the stator cores, and an output side bearing that rotates and supports a side, near an output portion for operating an operated member, of a rotary shaft inserted and fixed into the rotor are formed integrally by insert molding; the output side bearing is made of a resin; a lead screw is formed from the output portion of the rotary shaft to a portion thereof opposed to an inner surface of the output side bearing; and lubricant is filled in an opposed gap between the lead screw and the output side bearing.

According to the invention, since the output side bearing, which was conventionally constituted by a different member from the stator, is formed integrally with the stator cores by insert molding, the number of parts can be reduced and the position accuracy can be improved. Further, according to the invention, the lead screw is formed up to the portion of the rotary shaft opposed to the inner surface of the output side bearing, and the lubricant is filled in its portion. Therefore, though the metal frame that has been used in the related art is removed and the portion in the middle of the rotary shaft is held by the bearing, the rotating operation of the lead screw is smooth and run-out of the shaft is not produced.

DETAILED DESCRIPTION OF THE PREFERRED EMBODIMENTS

Figure 1:
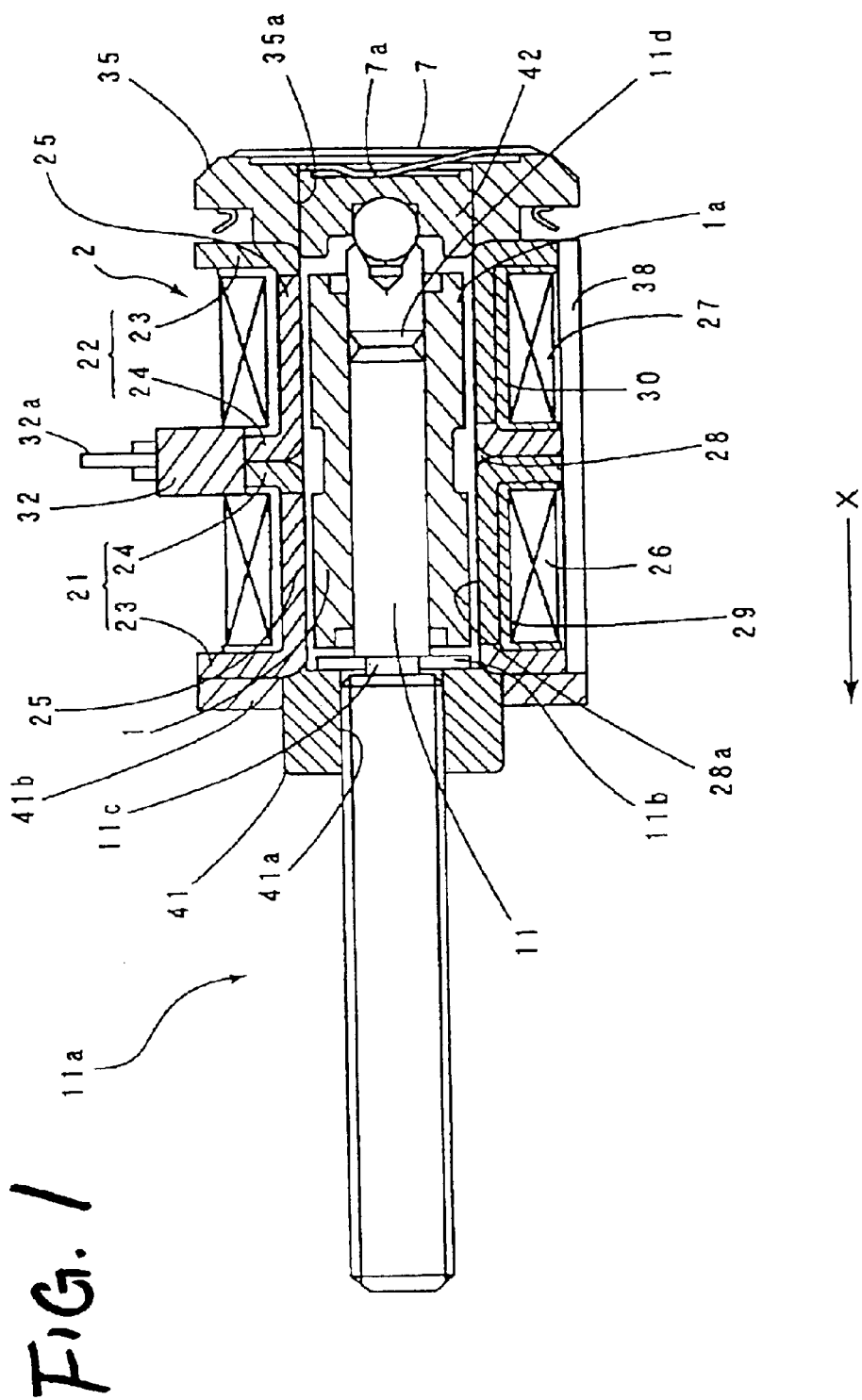
FIG. 1 is a sectional view showing the whole constitution of a motor in a mode for carrying out the invention.
Figure 2:
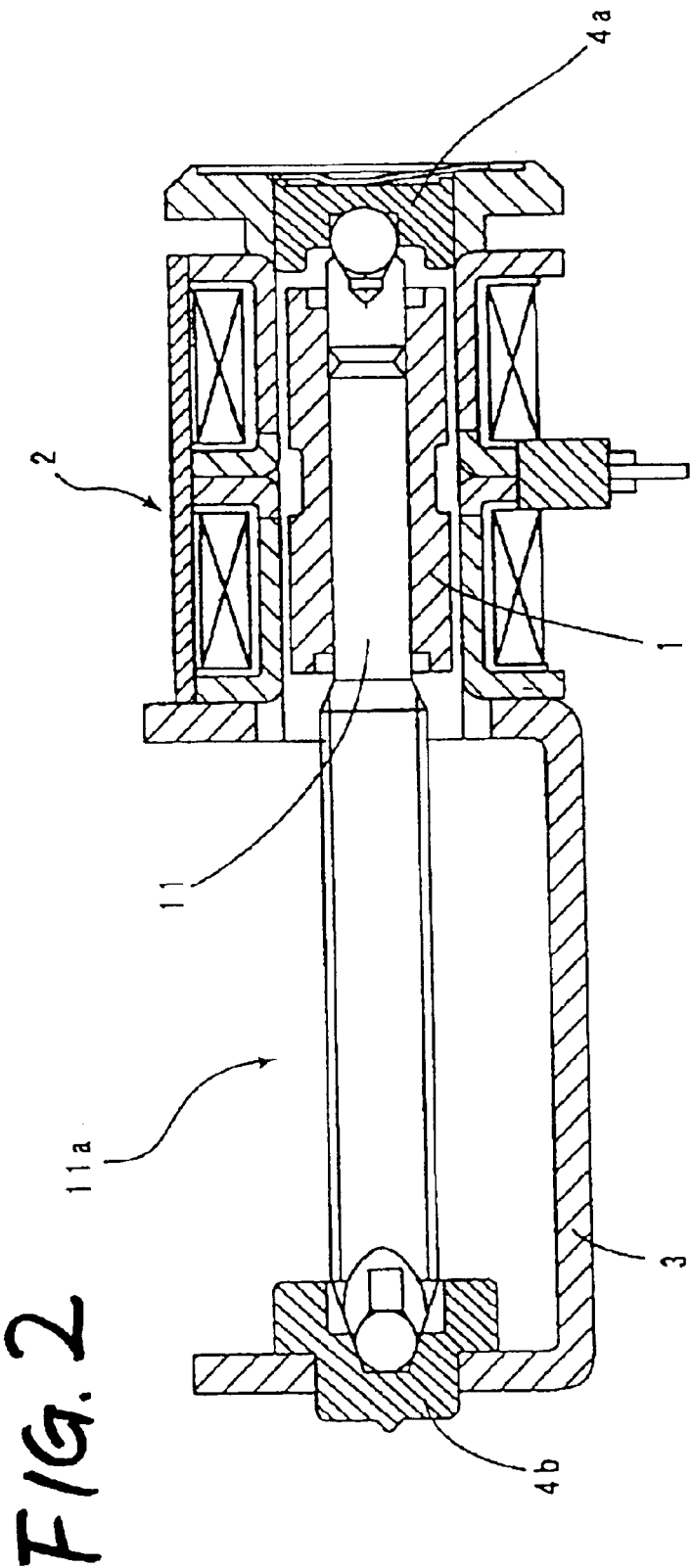
FIG. 2 is a sectional view showing the whole constitution of a conventional motor.

A mode for carrying out the invention will be described below. FIG. 1 is a sectional view showing the whole of a motor in this mode.

As shown in FIG. 1, the motor in this mode (herein simply referred to as a motor though the motor in this mode is constituted by a stepping motor) includes a stator 2 and a rotor 1 opposed to this stator 2. The rotor 1 rotates in a state where it has received the urging force in the axial direction (more specifically, in the direction of an arrow X in FIG. 1) by an urging member 7 which will be described later.

In the center of the rotor 1, a rotary shaft 11 is inserted and fixed so that one side protrudes greatly from the rotor 1. A base portion of the protruding portion of the rotary shaft 11 is supported by an output portion side bearing 41 formed integrally with the stator 2. The output shaft 11 passes through this output portion side bearing 41 and the leading end of the shaft further protrudes from the output portion side bearing 41. The protruding portion of the rotary shaft 11 from the output portion side bearing 41 functions as an output portion 11a for operating a head member (not shown) that is an operated member for driving a lens.

In the rotary shaft, a lead screw is continuously formed from this output portion 11a to a portion opposed to an inner surface 41a of the output portion side bearing 41 arranged near the output portion 11a. By this constitution, a head member fitted to the lead screw of the portion which functions as the output portion 11a is operated directly by the lead screw.

The stator 2 comprises two sets of metal-made stator cores 21 and 22, which are axially superimposed, and the rotor 1 is rotatably arranged in this stator 2. Each of the stator cores 21 and 22 has an outer yoke 23 arranged on the axial outside in the state where the stator cores 21 and 22 are superimposed, and an inner yoke 24 arranged adjacently in the superimposed state. These both yokes 23 and 24 are made of a magnetic metal member. Inside of their yokes, polar teeth 25 opposed to the outer surface of a magnet portion 1a of the rotor 1 are provided.

The two sets of outer yoke 23 and inner yoke 24 are formed integrally with a resin coil bobbin 28 for winding coil wires 26 and 27 thereon by insert-molding, and between a pair of the corresponding inner yoke 24 and the outer yoke 23, there is a coil wire space for winding the coil wire 26 or 27. The coil bobbin 28 has coil wire built-in portions 29 and 30 for winding each of the coil wires 26 and 27, and a hole portion 28a that surrounds the rotor 1 at its inner surrounding portion. The surface of the polar teeth 25 is, in this hole portion 28a, exposed inside the hole, and opposed to a magnet portion 1a of the rotor 1 which will be described later.

Winding start portions and winding end portions of the coil wires 26 and 27 wound on the coil wire built-in portions 29 and 30 of the coil bobbin 28 are respectively tied on a terminal pin 32a erected on a terminal portion 32. This terminal portion 32 is formed integrally with the coil bobbin 28, and protruded outward in the radial direction from an opening portion of a metal-made case member 38.

Further, the stator 2, in FIG. 1, has a cap portion 35 protruded axially from the axial opening portion of the case member 38. This cap portion 35 is arranged on a rear end side of the rotor 1, and has a circular hole 35a for holding movably in the axial direction the opposite output portion side bearing 42 constituted by a slide bearing that supports the rear end of the rotary shaft 11 of the rotor 1 after the rotor 1 was inserted into the stator 2.

At the assembly, this hole 35a functions as an inlet for inserting the rotor 1 into the stator 2. Therefore, an inner diameter of this hole 35a is formed larger than an outer diameter of the magnet portion 1a of the rotor 1. The thus constructed cap portion 35 is formed integrally with the coil bobbin 28 that integrates the stator cores 21 and 22 by the insert molding, and the hole 35a of this cap portion 35 becomes a communication hole communicating with the hole portion 28a.

After the opposite output portion side bearing 42 has been fitted into the hole 35a of the cap portion 35, an urging member 7 having a leaf spring 7a that comes into contact with the rear end of the opposite output portion side bearing 42 and urges the opposite output portion side bearing 42 onto the output portion side bearing 41 is fitted into the hole 35a thereby to be held. Namely, the opposite output portion side bearing 42 that supports the rear end of the rotary shaft 11 of the rotor 1 is located between the urging member 7 and the rotary shaft 11. The urging member 7 gives always the urging force to the opposite output portion side bearing 42 in the direction toward the output portion side bearing 41, whereby it urges the rotor 1 onto the output portion side bearing 41 and presses the rotary shaft 11 against the output portion side bearing 41, so that the rotation of the rotor 1 is stabilized. Namely, the cap portion 35 functions as an opposite output portion side bearing holding portion for holding the urging member 7 and the opposite output portion side bearing 42 that comes into contact with this urging member 7.

Further, onto the end surface of one of the outer yokes 23 of the stator 2, an attaching plate 41b is fixed. In the center of this attaching plate 41b, the output portion side bearing 41 is fitted. Namely, the output portion side bearing 41 is formed of a resin integrally with the resin cap portion 35 and coil bobbin 28. The attaching plate 41b is fixed to the coil bobbin 28 so as to fit this output portion side bearing 41 into its center hole.

To the inner surface 41a of the output portion side bearing 41, the extension portion of the lead screw of the rotary shaft 11 is opposed. In a gap formed by this opposed arrangement, lubricant (not shown) is filled. Therefore, the rotation of the lead screw becomes smooth by this lubricant.

The thus constructed output portion bearing 41 functions as a radial bearing that supports the rotary shaft 11 of the rotor 1 rotatably, and as a position control portion that performs position control of the rotor 1 to the thrust position upon reception of the urging force given by the urging member 7.

Therefore, when the rotor 1 is urged by the urging force of the urging member 7 in the direction of an arrow X in FIG. 1, a resin C-shaped washer 11b fitted into a narrow part 11a of the rotary shaft 11 of the rotor 1 is pressed against the end surface of the output portion side bearing 41. Namely, the outer diameter of the C-shaped washer 11b is formed larger than the hole diameter of the output portion side bearing 41, and by the movement of the rotor 1 in the direction of the arrow X, the end surface of the C-shaped washer 11b is pressed against the end surface of the output portion side bearing 41.

The thus constructed output portion side bearing 41 is made of the resin in which the stator cores 21 and 22 are insert-molded together with the cap portion 35 functioning as the opposite output portion side bearing holding portion. In the hole portion 28a of the stator 2, the rotor 1 is arranged rotatably.

The rotor 1 includes the magnet portion 1a opposed to the polar teeth 25 of the stator 2, and the metal-made rotary shaft 11 inserted and fixed into the rotary center hole of this magnet portion 1a with adhesive so that its one side protrudes from the axial end surface of the magnet portion 1a.

In a portion of the rotary shaft 11 where is located inside the magnet portion 1a, an adhesive staying groove 11d is formed.

Between the portion of the rotary shaft 11 inside the magnet portion 1a and the portion of the shaft in which the lead screw is formed, as described above, the narrow part 11c is formed, and the resin C-shaped washer 11b is fitted to this narrow part 11c. Further, at the portion of the rotary shaft 11 protruding from the magnet portion 1a and at the outer surrounding on the leading end side of the rotary shaft 11 from the narrow part 11c, the lead screw is formed.

This rotor 1 is inserted into the hole portion 28a from the cap portion 35 side of the stator 2 with the side where the lead screw is formed at the head, thereby to be built in the stator 2. Namely, the leading end on the lead screw side of the rotary shaft 11 of the rotor 1 is firstly inserted into the hole 35a of the cap portion 35, and then the leading end side of the lead screw passes through the hole portion 28a and the hole of the output portion side bearing 41. Next, most of the lead screw is protruded from the output portion side bearing 41.

Thereafter, in this state, the opposite output portion side bearing 42 comprising the slide bearing is inserted into the hole 35a of the cap portion 35, and while the leaf spring 7a is being brought into contact with the rear end side of this opposite output portion side bearing 42, the cap portion 35 is covered with the urging member 7, whereby the motor is assembled. In the thus assembled motor, when the electric current is supplied to the coil wires 26 and 27 of the stator 2, the rotor 1 is rotated about the rotary shaft 11, urged onto the output portion side bearing 41 side and supported by the both bearings 41 and 42.

The above-mentioned embodiment is an example of the preferred embodiment of the invention, the invention is not limited to this embodiment, and it is to be understood that various changes and variations may be made without departing from the spirit or scope of the invention. For example, in this embodiment, the lead screw is formed not only at the output portion 11a but also up to the position opposed to the inner surface of the output portion side bearing 41. However, this constitution is not adopted but the lead screw may be formed only at the output portion 11.

Further, in the embodiment, the lead screw is formed on the output portion 11a side of the rotary shaft 11, however the lead screw may not be particularly formed. For example, the lead screw is not formed at the rotary shaft 11 but the rotary shaft may be constituted by only the shaft. Further, a gear may be held at the output portion 11a of the rotary shaft 11 in order to transmit the rotational force through the gear to the operated member.

As described above, in the invention, the two stator cores arranged, superimposed axially are formed by the insert-molding integrally with the coil bobbin, the output portion side bearing and the opposite output portion side bearing holding portion. Namely, the output portion side bearing and the opposite output portion side bearing holding portion which were constituted by the different member from the stator in the related art are integrated with the stator core by the resin-molding in the invention. Therefore, since assembly error of each member (stator portion and the both bearing) is not produced compared with the related art, shaft accuracy can be improved. Further, the number of parts can be reduced greatly.

What is claimed is:

1. A small-sized stepping motor comprising:
   a substantially cylindrical shaped rotor including a rotor magnet portion;
   a rotary shaft inserted and fixed through said rotor magnet portion, said rotary shaft including a narrow portion provided on an output side of said rotary shaft so as to be separated from the rotor magnet portion;
   a stator opposed to said rotor, wherein the stator comprises two pairs of stator cores, each stator core comprising an inner yoke and an outer yoke, and the inner and outer yokes being integrated by a coil bobbin;
   an output side bearing provided on an output side face of one of the two pairs of stator cores of said stator, and supporting a portion near an output portion of said rotary shaft;
   an opposite side bearing holding portion provided on an opposite side face of the other of the two pairs of stator cores of said stator for holding an opposite side bearing movable in an axial direction and supporting an opposite side of said rotary shaft;
   an urging member held by the opposite side bearing holding portion for urging the opposite side bearing toward the output side so that the rotor and the rotary shaft are urged toward the output side; and
   a resin washer fitted on said narrow portion of said rotary shaft and pushed by the urging member via the narrow portion of said rotary shaft to be brought into contact with the output side bearing to thereby be positioned in the axial direction of the rotary shaft;
   wherein said stator cores are integrally formed with the coil bobbin by insert molding, and said output side bearing, the coil bobbin and the opposite side bearing holding portion are made of the same resin and integrally formed with each other, whereby the output side bearing and the opposite side bearing holding portion are integrated through the coil bobbin with the same resin;
   wherein a lead screw is formed at the output portion protruded from the output side bearing and a rotation of said lead screw directly moves an operated member.

2. A motor according to claim 1, wherein a hole having an inner diameter larger than an outer diameter of said rotor is formed in said opposite side bearing holding portion.

3. A motor according to claim 2, wherein said opposite side bearing is constituted by an axially movable slide bearing, which is disposed in said hole and urged toward the output portion side; and an end of said rotary shaft is supported by said opposite side bearing.

4. A small-sized stepping motor comprising:
   a substantially cylindrical shaped rotor including a rotor magnet portion;
   a rotary shaft inserted and fixed through said rotor magnet portion, said rotary shaft including a narrow portion provided on an output side of said rotary shaft so as to be separated from the rotor magnet portion;
   a stator opposed to said rotor, wherein the stator comprises two pairs of stator cores, each stator core comprising an inner yoke and an outer yoke, and the inner and outer yokes being integrated by a coil bobbin;
   an output side bearing provided on an output side face of one of the two pairs of stator cores of said stator, and supporting a portion near an output portion;
   an opposite side bearing holding portion provided on an opposite side face of the other of the two pairs of stator cores of said stator for holding an opposite side bearing movable in an axial direction and supporting an opposite side of said rotary shaft;
   an urging member held by the opposite side bearing holding portion for urging the opposite side bearing toward the output side so that the rotor and the rotary shaft are urged toward the output side; and a resin washer fitted on said narrow portion of said rotary shaft and pushed by the urging member via the narrow portion of said rotary shaft to be brought into contact with the output side bearing to thereby be positioned in the axial direction of the rotary shaft;

wherein said stator cores are integrally formed with the coil bobbin by insert molding, and said output side bearing, the coil bobbin and the opposite side bearing holding portion are made of the same resin, and integrally formed with each other, whereby the output side bearing and the opposite side bearing holding portion are integrated with the stator cores through the coil bobbin with the same resin; and wherein a lead screw is formed on said rotary shaft from said output portion of said rotary shaft to a portion which is opposed to an inner surface of said output side bearing; and wherein lubricant is filled in a gap formed between said lead screw and said output side bearing.

* * * * *